United States Patent
Fan

(10) Patent No.: US 8,495,666 B1
(45) Date of Patent: Jul. 23, 2013

(54) OPTICAL DISC DRIVE AND EJECTION MECHANISM THEREOF

(75) Inventor: Chin-Lung Fan, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/607,874

(22) Filed: Sep. 10, 2012

(30) Foreign Application Priority Data

Jan. 31, 2012 (TW) .............................. 101102985 A

(51) Int. Cl.
*G11B 33/12* (2006.01)

(52) U.S. Cl.
USPC ............................................................. 720/646

(58) Field of Classification Search
USPC .......................................................... 720/646
See application file for complete search history.

(56) References Cited

U.S. PATENT DOCUMENTS

| | | | |
|---|---|---|---|
| 7,554,802 B2 * | 6/2009 | Tsai | 361/679.33 |
| 7,945,922 B2 * | 5/2011 | Akabori et al. | 720/646 |
| 7,996,858 B2 * | 8/2011 | Ohira | 720/646 |
| 8,122,462 B2 * | 2/2012 | Yoshida | 720/646 |
| 8,185,920 B2 * | 5/2012 | Wang et al. | 720/646 |
| 2009/0199221 A1 | 8/2009 | Wang et al. | |

FOREIGN PATENT DOCUMENTS

TW M410313 8/2011

* cited by examiner

*Primary Examiner* — Mark Blouin
(74) *Attorney, Agent, or Firm* — Li & Cai Intellectual Property (USA) Office

(57) ABSTRACT

The instant disclosure relates to an optical disc drive, which includes a tray, a front cover fixed to the tray, and an eject key. The tray has a control surface facing the ejecting direction and an ejection switch disposed thereon. The front cover has a base portion and a switch opening formed thereon. The eject key has a control portion, an abutting portion connected to the control portion, and at least one elastic member. The control portion is slidably disposed on the outer surface of the front cover toward a first direction diagonal to the ejecting direction. The elastic member is disposed in between the control portion and the front cover. The control portion can be displaced toward the first direction in causing the abutting portion to generate a horizontal displacement parallel to the ejecting direction toward the ejection switch. The instant disclosure also describes an ejection mechanism.

20 Claims, 8 Drawing Sheets

OPTICAL DISC DRIVE AND EJECTION MECHANISM THEREOF

BACKGROUND OF THE INVENTION

1. Field of the Invention

The instant disclosure relates to an optical disc drive and ejection mechanism thereof; more particularly, to an optical disc drive having a tray and an eject key, along with an ejection mechanism that prevents accidental ejection of the tray from disc drive.

2. Description of Related Art

The majority of desktop and laptop computers today are equipped with optical disc drives. Both internal and external drives utilize an eject key to release the tray from the drive bay. However, if the eject key is pressed accidentally by the user while using the computing device, the tray may eject undesirably.

To address the above issue, the inventor has previously obtained a patent titled "Optical Disc Drive" (Taiwan Patent # M410313). For this patent, an eject key has to be pressed and travel a certain distance, before ejecting the tray for preventing accidental ejection. However, the above method is limited to horizontal ejection of the tray, where the eject key has to travel a longer distance. Moreover, the above technique is restricted to customized optical disc drive and may not be suitable for use with standard type.

To address the abovementioned issues while maintaining the standard specifications for optical disc drives, the inventor modifies the horizontal ejection technique to better prevent accidental release of the tray.

SUMMARY OF THE INVENTION

The object of the instant disclosure is to provide an optical disc drive capable of preventing accidental ejection of the tray.

The optical disc drive of the instant disclosure comprises a tray, a front cover, and an eject key. The tray has a control surface facing the ejecting direction and an ejection switch disposed thereon. The front cover is fixed on the control surface of the tray. The front cover has a plate-shaped base portion and a switch opening formed thereon for accommodating the ejection switch. The eject key has a control portion, an abutting portion connected to the control portion and facing the control surface, and a pair of elastic members. The control portion is slidably disposed on the outer surface of the front cover toward a first direction, where the first direction is defined slantingly relative to the ejecting direction. One end of each elastic member is connected to the control portion. The other end penetrates the switch opening and is fixed to the inner side of the front cover. A positional displacement along the first direction is defined by the control portion relative to the ejection switch. Whereas a positional displacement is defined in a direction parallel to the ejecting direction and toward the ejection switch by the abutting portion.

The instant disclosure further provides an ejection mechanism for preventing accidental ejection of the tray for an optical disc drive. The ejection mechanism is disposed on the tray. The tray has a control surface defined facing the ejecting direction and an ejection switch disposed thereon. The ejection mechanism includes a front cover and an eject key. The front cover is fixed on the control surface of the tray. The front cover has a plate-shaped base portion and a switch opening formed thereon for accommodating the ejection switch. The eject key has a control portion, an abutting portion connected to the control portion and facing the control surface, and a pair of elastic members. The control portion is slidably disposed on the outer surface of the front cover toward a first direction, where the first direction is defined slantingly relative to the ejecting direction. One end of each elastic member is connected to the control portion. The other end penetrates the switch opening and is fixed to the inner side of the front cover. A positional displacement along the first direction is defined by the control portion relative to the ejection switch. Whereas a positional displacement is defined in a direction parallel to the ejecting direction and toward the ejection switch by the abutting portion.

The instant disclosure has the following advantages. Namely, by modifying the conventional horizontal ejection operation, accidental tray ejection can be eliminated while the user is holding the electronic device. More specifically, the user has to move the eject key along the first direction diagonal to the tray ejecting direction to eject the tray.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE EMBODIMENTS

Figure 1:
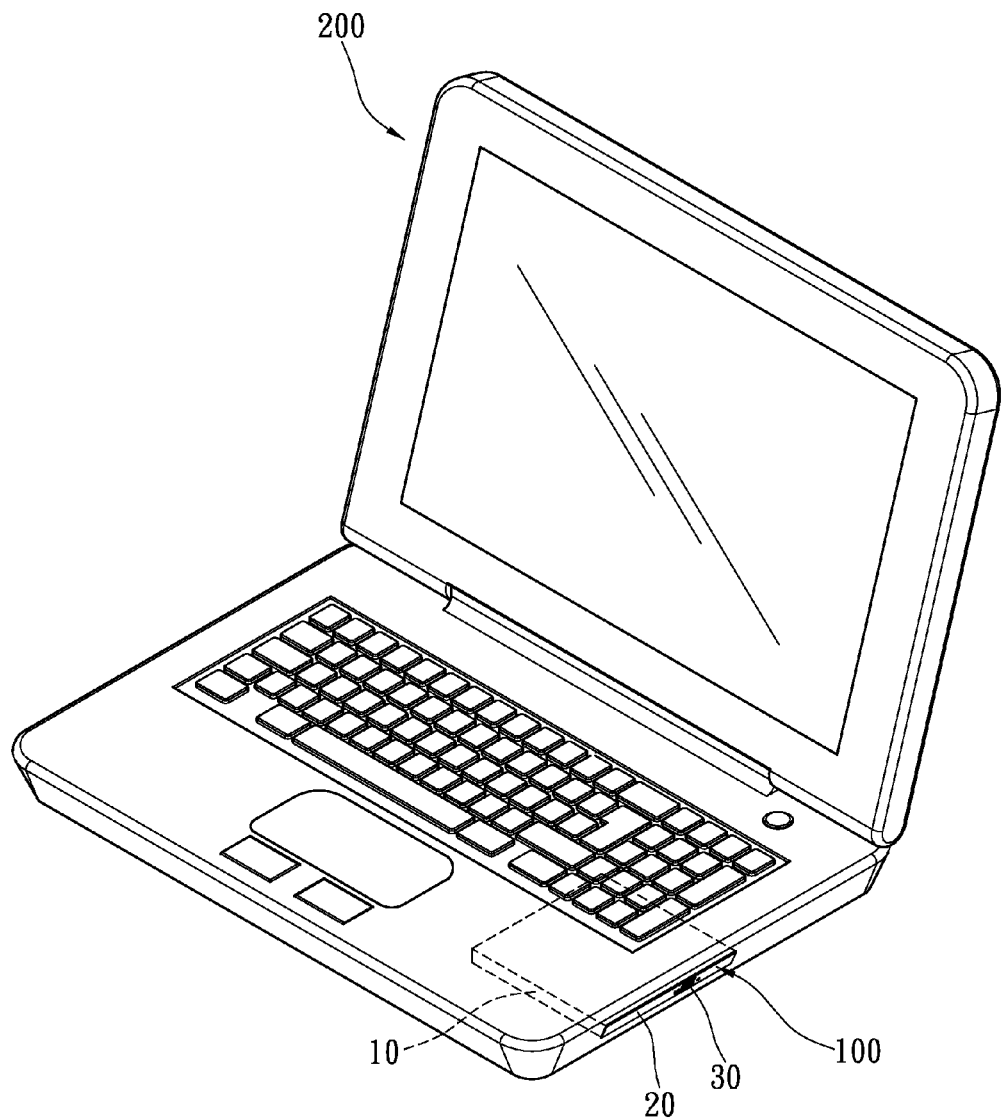
FIG. 1 is a perspective view showing a laptop computer equipped with an optical disc drive having an ejection mechanism of the instant disclosure.

Please refer to FIG. 1, which is a perspective view showing a laptop computer 200 equipped with an optical disc drive 100 having ejection mechanism of the instant disclosure. The description provided hereinafter is based on the optical disc drive 100 disposed on the laptop computer 200. However, the optical disc drive 200 is not restricted solely for use with laptop computers. The optical disc drive 200 is also applicable to standard desktop computers and external disc drives.

The optical disc drive 100 includes a tray 10 for carrying a disc, a front cover 20, and an eject key 30. The tray 10 is slidably disposed inside the optical disc drive 100 along an ejection direction. Based on the orientation of the figure, the ejection direction is directed along the lower right direction in FIG. 1. The eject key 30 is slidably disposed on the outer surface of the front cover 20. The front cover 20 and the eject key 30 cooperatively form the ejection mechanism of the instant disclosure.

Figure 2:
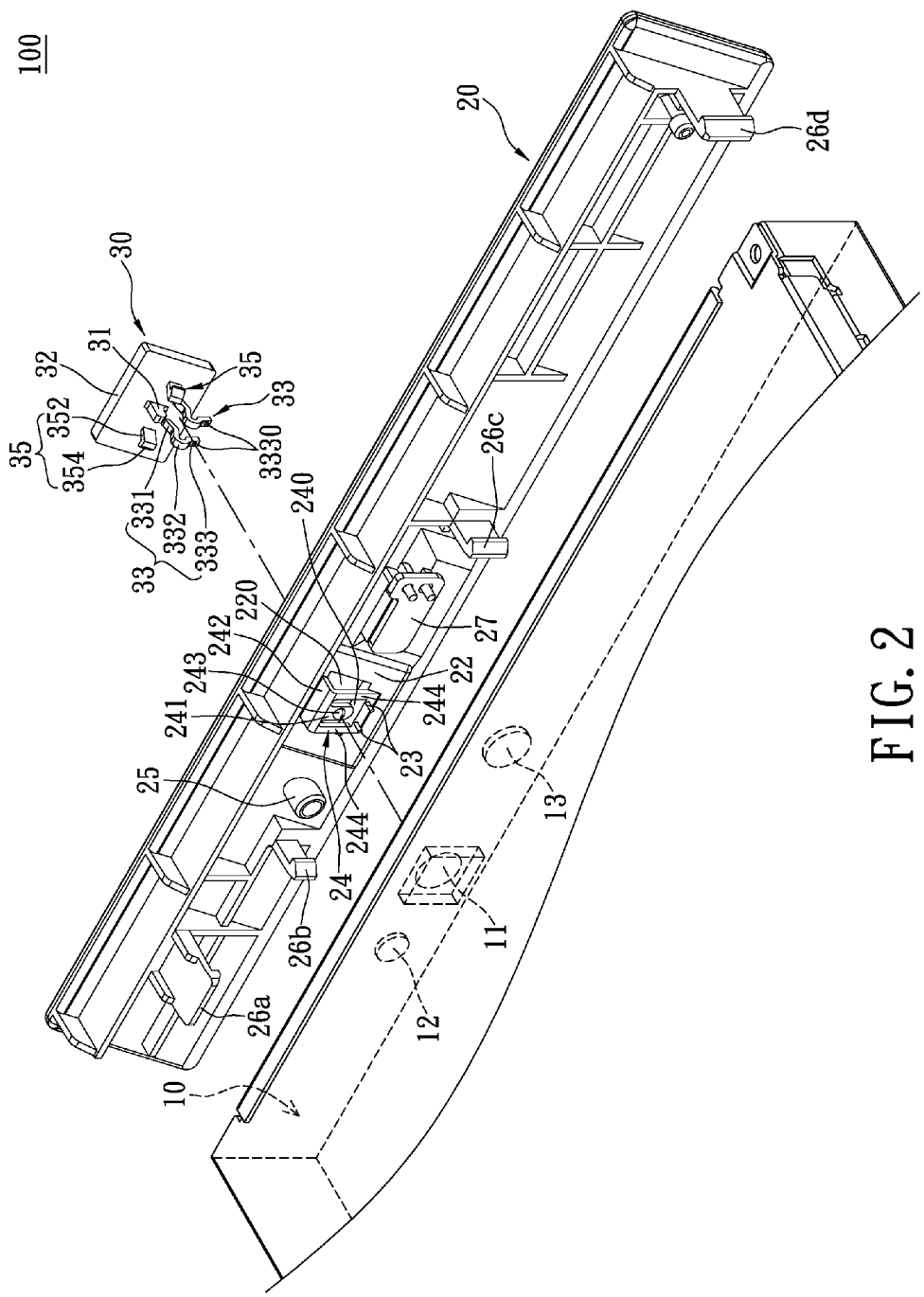
FIG. 2 is an exploded view of the ejection mechanism of the optical disc drive of the instant disclosure.
Figure 3:
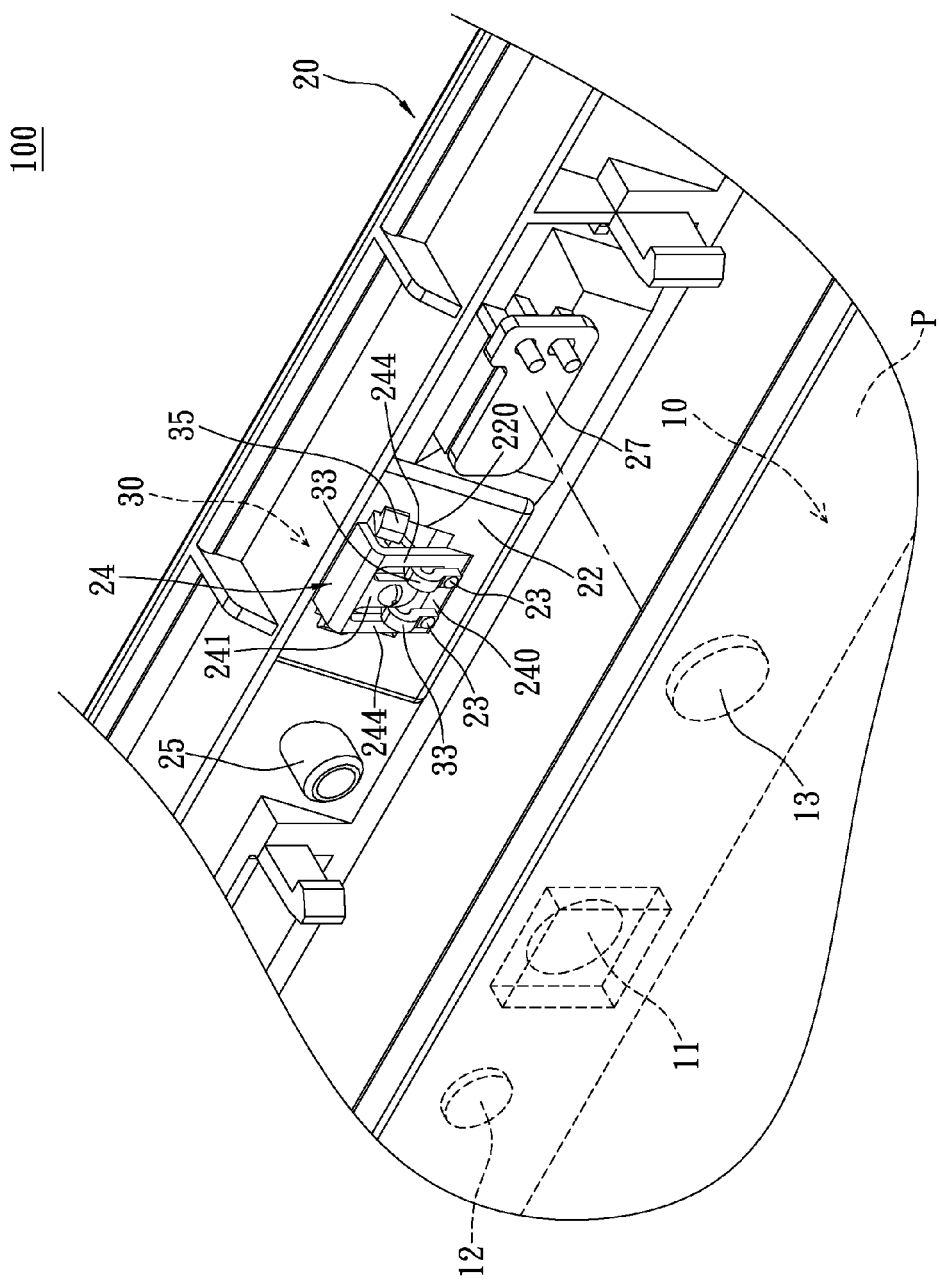
FIG. 3 is an assembled view of the ejection mechanism of the optical disc drive of the instant disclosure.

Please refer to FIGS. 2 and 3. The tray 10 is accommodated inside the housing of the optical disc drive 100. For the instant embodiment, the tray is represented by the numeral 10. A control surface P of the tray 10 is defined by the front end surface of the housing. The control surface P faces the ejecting direction of the tray 10. An ejection switch 11, a force ejection switch 12, and a display light 13 are disposed on the control surface P. The control surface P of the tray 10 is kept under standard specifications without changing the ejection switch 11 nor the display light 13. Thus, the ejection mechanism for preventing accidental tray ejection in a confined space is provided by the instant disclosure.

The front cover 20 is fixed to the control surface P of the tray 10. A plurality of hooks 26a, 26b, 26c, and 26d are disposed on the inner surface of the front cover 20 for engaging the control surface P of the tray 10. The front cover 20 has a plate-shaped base portion 22 and a switch opening 220 formed thereon corresponding to the ejection switch 11. The base portion 22 is formed diagonally to the ejecting direction of the tray 20. In other words, the base portion 22 is formed slantingly to the horizontal direction in the figures. For explanation purposes, this slanting direction is defined as a first direction herein.

The front cover 20 further has an access structure 24 disposed on the inner side of the base portion 22. The access structure 24 works cooperatively with the eject key 30 to activate the ejection switch 11. The access structure 24 includes a pusher 241, a fixing portion 242, and a pair of ribs 244. The pusher 241 is extended to be in between the eject key 30 and the ejection switch 11 of the tray 10. The fixing portion 242 is connected to the base portion 10 and faces the control surface P. The fixing portion 242 is generally parallel to the ejecting direction of the tray 10. The ribs 244 bendingly extend from the fixing portion 242 and connect to the base portion 10. The ribs 244 are substantially parallel to the control surface P. A central space 240 is cooperatively defined by the surrounding ribs 244 and the fixing portion 242. The pusher 241 extends from the fixing portion 242 to the central space 240. The above described structure protects the pusher 241 and making it elastic.

The front cover 20 further has a force ejection hole 25 formed thereon and a display portion 27. The force ejection hole 25 and the display portion 27 are arranged on opposite sides of the switch opening 220. Accordingly, the force ejection hole 25 corresponds to the force ejection switch 12, and the display portion 27 corresponds to the display light 13.

The eject key 30 has a control portion 32, an abutting portion 31 connected to the control portion 32 and facing the control surface P, and a pair elastic members 33. The control portion 32 is slidably disposed on the outer surface of the front cover 20 along the first direction. One end of each elastic member 33 is connected to the control portion 32. Whereas the other end of each elastic member 33 penetrates through the switch opening 220 and is fixed to the inner side of the front cover 20. The elastic members 30 serve to return the eject key 30 to the home position, where the home position is defined as the position of the eject key 30 prior to being pushed by the user.

For the instant embodiment, the number of elastic members 33 is two. Each of the elastic members 33 has a protruding beginning portion 331, a curved portion 332 extending from the beginning portion 331, and an end portion 333 extending downwardly from the curved portion 332. The end portion 333 is fixed to the inner side of the front cover 20. For connecting the elastic members 33 to the front cover 20, a pair of tubular members 23 is disposed on the inner surface of the front cover 20 facing the ejection switch 11. The end portion 333 has a hole 3330 formed thereon for fixing to the corresponding tubular member 23 by hot melting. The above description only shows one type of the elastic members, which can be formed integrally with the eject key 30. However, the type of elastic member is not restricted thereto. For example, the elastic member may be a spring disposed between the eject key 30 and the front cover 20.

To force the eject key 30 to move toward the first direction along the front cover 20, the eject key 30 further has a pair of restricting members 35 extending from the control portion 32 toward the front cover 20. The restricting members 35 have a hook-like shape. Each of the restricting members 35 has an arm portion 352 and a hook portion 354. The restricting members 35 are movably disposed on opposite inner edges of the switch opening 220.

Please refer to FIG. 3, which is an assembled view of the ejection mechanism of the instant disclosure. The elastic members 33 are arranged on opposite sides of the pusher 241. More specifically, each of the elastic members 33 is arranged in the gap between the pusher 241 and the corresponding rib 244. Thus, the access structure 24 is capable of restricting the moving direction of the elastic members 33. The restricting members 35 are normally located at the upper ends of the switch opening 220. However, when the eject key 30 is pushed downward toward the first direction, the restricting members 35 would move along the opposite inner edges of the switch opening 220.

Figure 4:
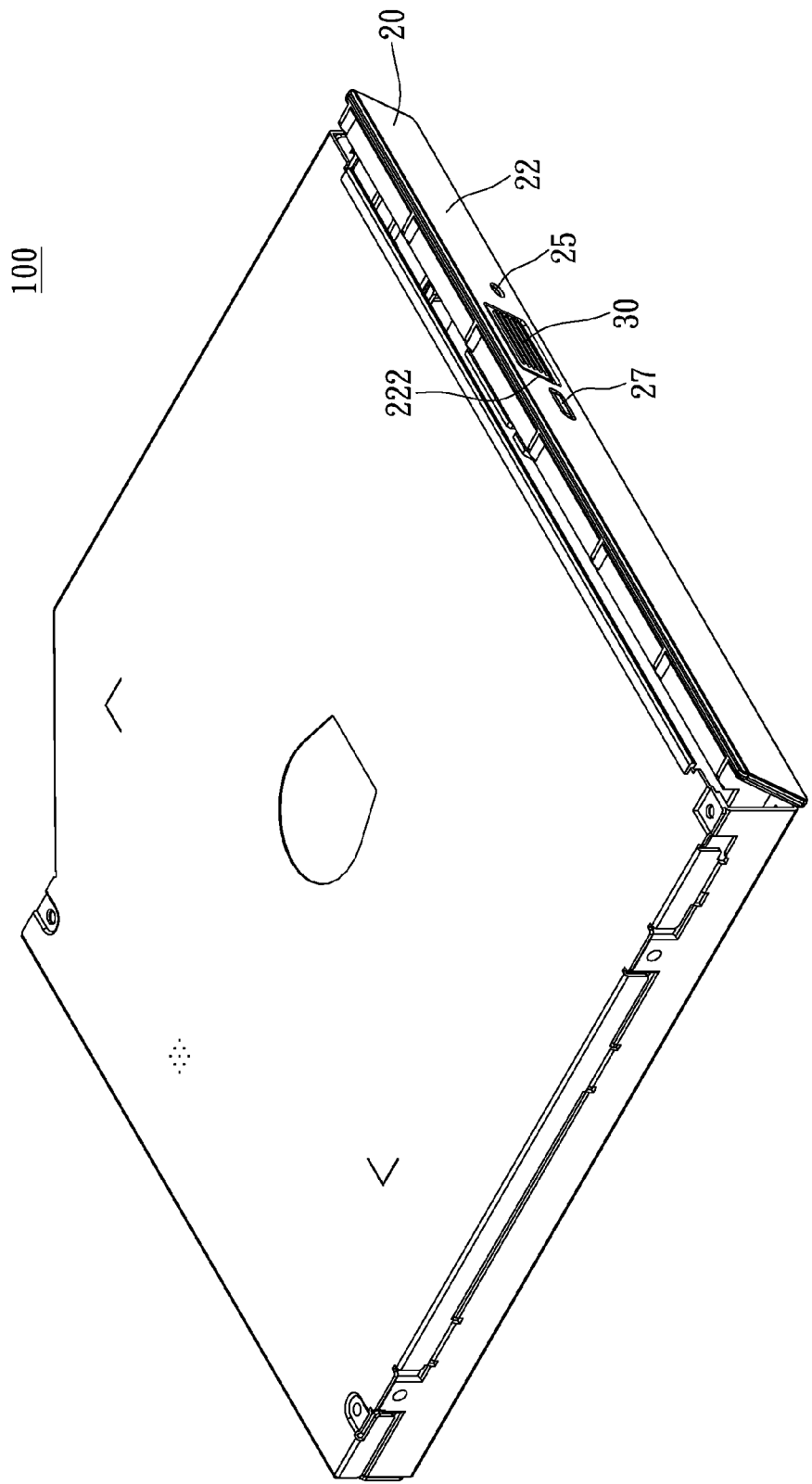
FIG. 4 is a perspective view of the optical disc drive having the ejection mechanism of the instant disclosure.

Please refer to FIG. 4, which is an assembled view of the optical disc drive having the ejection mechanism of the instant disclosure. When assembling, the front cover 20 is first engaged to the control surface P. Then, the optical disc drive is assembled to the laptop computer, the desktop computer, or the external optical disc drive. A slot 222 is formed on the front cover 20, where the eject key 30 is slidably disposed in the slot 222. The instant disclosure modifies the original horizontal ejection employed by the ejection switch 11 of the control surface P. In particular, the front cover 20 is slanted with respect to the horizontal ejecting direction toward the first direction. Thus, when the user is holder the computing device and accidentally touches the eject key 30, the tray will not be released.

Figure 5:
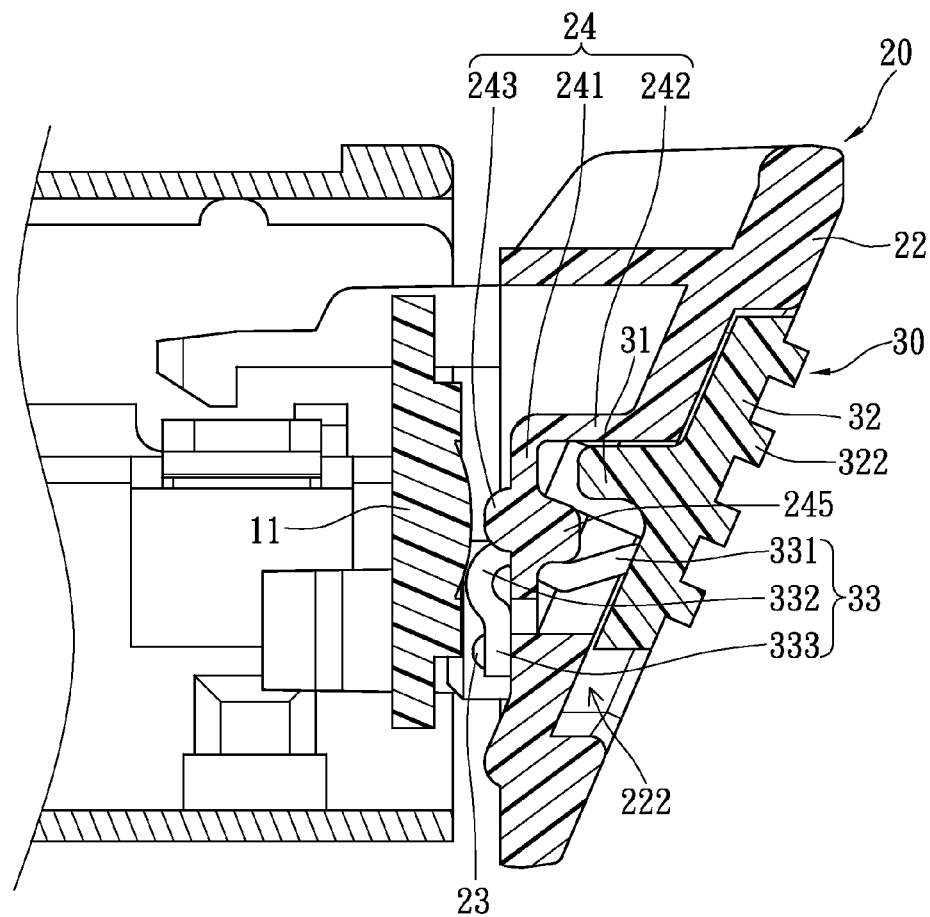
FIG. 5 is a cross-sectional view of the ejection mechanism along a pusher (home position).

Please refer to FIG. 5, which is a cross-sectional view of the ejection mechanism of the instant disclosure, where the pusher 241 is at the home position. The pusher 241 works in cooperation with the abutting portion 31 of the eject key 30. More specifically, the pusher 241 is arranged in the path of the abutting portion 31. The pusher 241 is pushable by the eject key 30 to activate the ejection switch 11.

Figure 6:
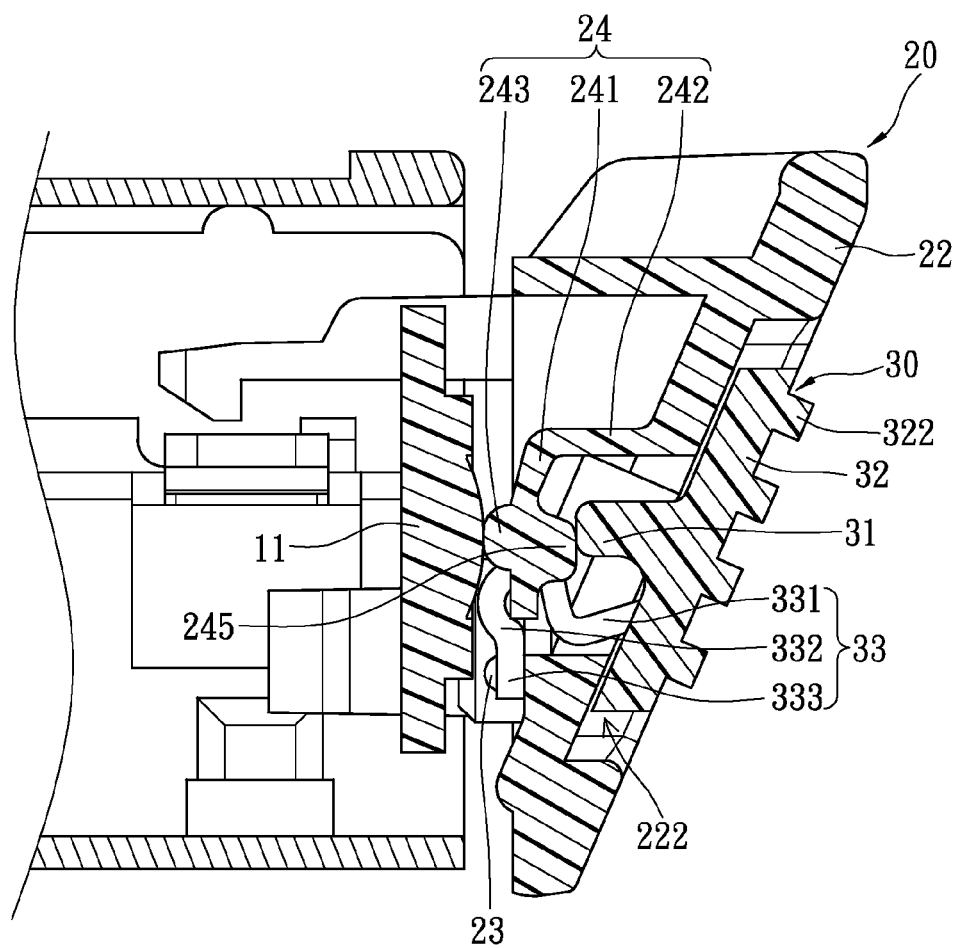
FIG. 6 is a cross-sectional view of the ejection mechanism along the pusher (operating position).

When ejecting the tray 10, the user may use his or her finger to push the eject key 30 toward the first direction (i.e., toward the bottom left direction in FIG. 5), where the first direction is diagonal to the tray ejecting direction. Thus, relative to the ejection switch 11, the control portion 32 is displaced along the first direction. Part of this diagonal displacement is parallel to the tray ejecting direction and toward the ejection switch 11. The diagonal displacement forces the abutting portion 31 to perform a leftward movement and push the pusher 241. The pusher 241 is pushed forward to press on the ejection switch 11, as shown in FIG. 6. Thereby, the ejection mechanism is operated to eject the tray 10. Meanwhile, the elastic members 33 are being squeezed and temporarily deformed in accumulating a restoring force.

For the instant embodiment, the pusher 241 has a front protruding portion 243 formed on one side of the pusher 241 in a direction toward the ejection switch 11. A rear protruding portion 245 is formed on the opposite side of the pusher 241 in a direction toward the ejection switch 30. The pusher 241 also provides the required restoring force. When the eject key 30 is left alone by the finger, the eject key 30 is pushed by the pusher 241 and the stored energy released from the elastic members 33 back to the original home position.

Figure 7:
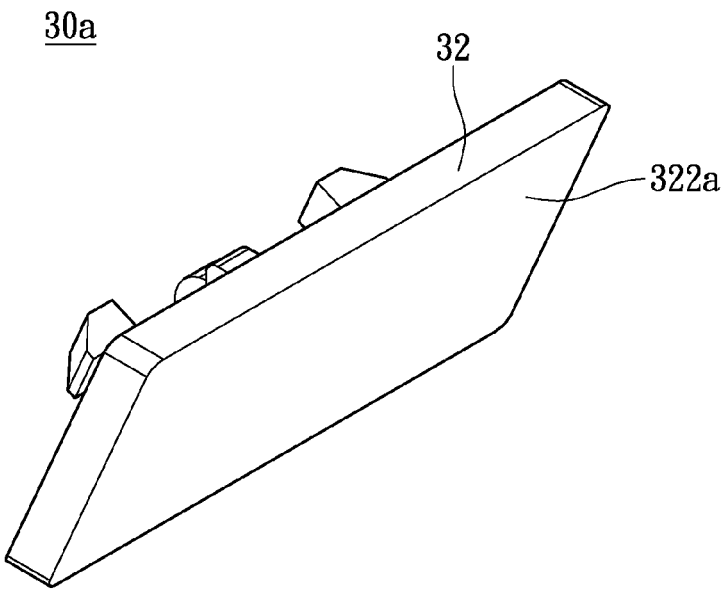
FIG. 7 shows a perspective view of an alternative eject key of the instant disclosure.
Figure 8:
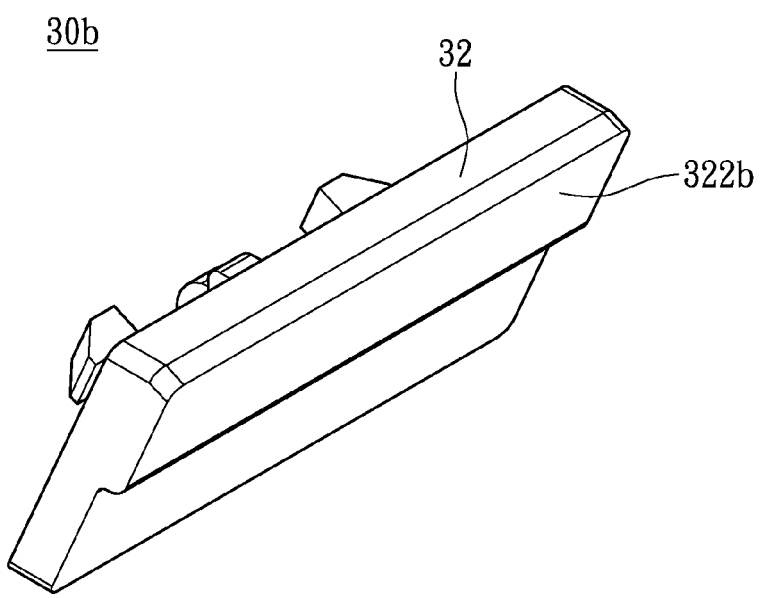
FIG. 8 shows a perspective view of yet another eject key of the instant disclosure.

To allow the user to manipulate the eject key 30 more conveniently, an anti-slip structure 322 is preferably arranged on the outer surface of the eject key 30. However, the structural configuration of the eject key 30 is not restricted thereto. For example, as shown in FIG. 7, a variant eject key 30a having a flat surface 322a is illustrated. Alternatively, another eject key 30b having a protrusion 322b is shown in FIG. 8.

Figure 9:
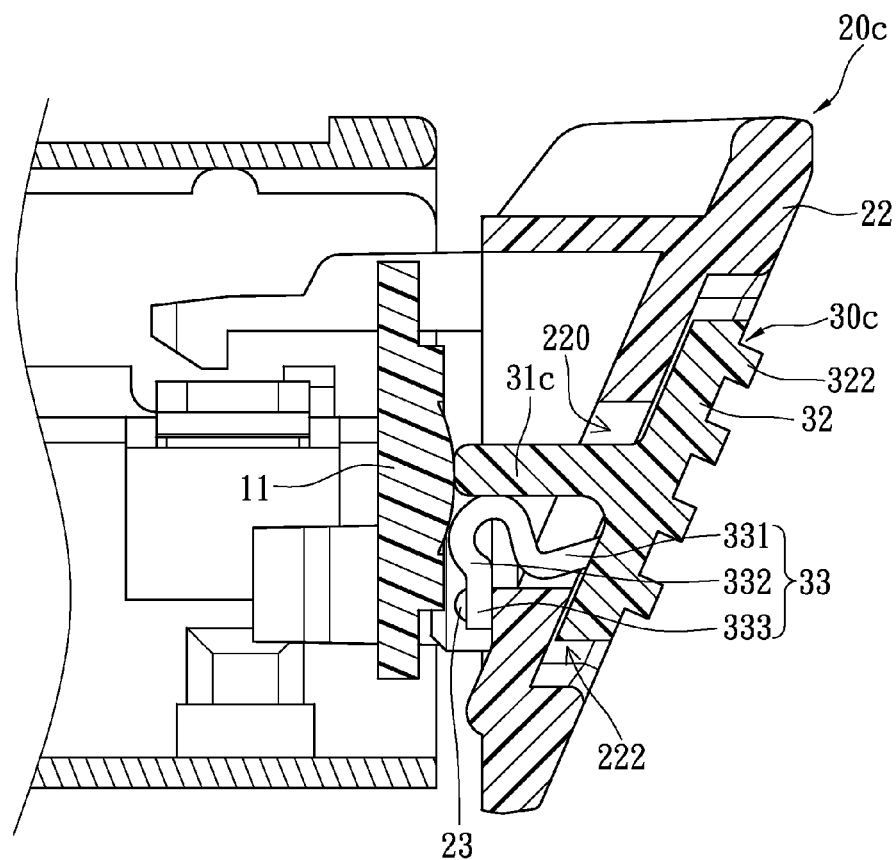
FIG. 9 is a cross-sectional view of the ejection mechanism along an alternative pusher of the instant disclosure.

Please refer to FIG. 9, which is a cross-sectional view showing an alternative ejection mechanism for the instant disclosure. The ejection mechanism shown in FIG. 9 includes a front cover 20c without the accessing structure 24. The front cover 20c only requires forming the switch opening 220 on the base portion 22 in corresponding to the ejection switch 11. Thus, the front cover 20c has a more simplified structure. Meanwhile, a corresponding eject key 30c has a longer abutting portion 31c. When the eject key 30c is pushed by the user, the abutting portion 31c moves toward the bottom left direction to abut the ejection switch 11 for releasing the tray 10. Thus, the ejection mechanism shown in FIG. 9 is also capable of preventing accidental ejection of the tray 10.

The aforementioned optical disc drive and ejection mechanism of the instant disclosure have the following technical characteristics and functions. Namely, by modifying the conventional horizontal ejection of the optical disc drive, when the user is holding the computing device, the palm or fingers of the user would not be able to eject the tray accidentally. In addition, based on the given space, the eject key 30 is disposed between the force eject hole 25 and the display portion 27, where standard design for the control surface P of the disc drive can be upheld.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An optical disc drive, comprising:
   a tray having a control surface facing the tray ejecting direction and an ejection switch disposed thereon;
   a front cover fixedly disposed on the control surface of the tray, wherein the front cover has a plate-shaped base portion and a switch opening formed thereon for the ejection switch; and
   an eject key having a control portion, an abutting portion connected to the control portion, and at least one elastic member, wherein the control portion is slidably disposed on the outer surface of the front cover toward a first direction diagonal to the tray ejecting direction, wherein one end of the elastic member is connected to the control portion and the other end thereof penetrates the switch opening and connects to the inner surface of the front cover;
   wherein the control portion is capable of moving toward the first direction relative to the ejection switch, while some displacement of the abutting portion is made in the horizontal direction toward the ejection switch.

2. The optical disc drive of claim 1, wherein the front cover further includes an access structure disposed on the inner surface of the base portion, and wherein the access structure has a pusher extended to be in between the eject key and the ejection switch of the tray corresponding to the abutting portion.

3. The optical disc drive of claim 2, wherein the access structure has a fixing portion connected to the base portion facing the control surface and a pair of ribs bendingly extends from opposite sides of the fixing portion in connection to the base portion, wherein a central space is cooperatively defined by the ribs and the fixing portion, and wherein the pusher extends from the fixing portion into the central space.

4. The optical disc drive of claim 2, wherein a front protruding portion and a rear protruding portion are formed on opposite sides of the pusher.

5. The optical disc drive of claim 1, wherein the number of elastic members is two, and wherein each of the elastic members has a beginning portion extending from the control portion of the eject key, a curved portion extending from the beginning portion, and an end portion extending downwardly from the curved portion fixed to the inner side of the front cover.

6. The optical disc drive of claim 5, wherein a pair of tubular members is disposed on the inner side of the front cover facing the ejection switch, and wherein the end portions of the elastic members are hot melt to the tubular members.

7. The optical disc drive of claim 1, wherein the eject key further has a pair of restricting members extending from the control portion in a direction toward the front cover, and wherein the restricting members are movably disposed on opposite inner edges of the switch opening.

8. The optical disc drive of claim 1, wherein a plurality of hooks is disposed on the inner surface of the front cover for engaging the control surface of the tray.

9. The optical disc drive of claim 1, wherein a slot is formed on the front cover, and wherein the eject key is movably disposed in the slot.

10. The optical disc drive of claim 1, wherein an anti-slip structure is disposed on the outer surface of the eject key.

11. An ejection mechanism, for an optical disc drive to prevent accidental ejection of a tray, is disposed on the tray, wherein the tray has a control surface facing the ejection direction and an ejection switch disposed on the control surface, comprising:
   a front cover fixedly disposed on the control surface of the tray, wherein the front cover has a plate-shaped base portion and a switch opening formed thereon for the ejection switch; and
   an eject key having a control portion, an abutting portion connected to the control portion, and at least one elastic member, wherein the control portion is slidably disposed on the outer surface of the front cover toward a first direction diagonal to the tray ejecting direction, wherein one end of the elastic member is connected to the control portion and the other end thereof penetrates the switch opening and connects to the inner surface of the front cover;
   wherein the control portion is capable of moving toward the first direction relative to the ejection switch, while some displacement of the abutting portion is made in the horizontal direction toward the ejection switch.

12. The ejection mechanism of claim 11, wherein the front cover further includes an access structure disposed on the inner surface of the base portion, and wherein the access structure has a pusher extended to be in between the eject key and the ejection switch of the tray corresponding to the abutting portion.

13. The ejection mechanism of claim 12, wherein the access structure has a fixing portion connected to the base portion facing the control surface and a pair of ribs bendingly extends from opposite sides of the fixing portion in connection to the base portion, wherein a central space is cooperatively defined by the ribs and the fixing portion, and wherein the pusher extends from the fixing portion into the central space.

14. The ejection mechanism of claim 12, wherein a front protruding portion and a rear protruding portion are formed on opposite sides of the pusher.

15. The ejection mechanism of claim 11, wherein the number of elastic members is two, and wherein each of the elastic members has a beginning portion extending from the control portion of the eject key, a curved portion extending from the beginning portion, and an end portion extending downwardly from the curved portion fixed to the inner side of the front cover.

16. The ejection mechanism of claim 15, wherein a pair of tubular members is disposed on the inner side of the front cover facing the ejection switch, and wherein the end portions of the elastic members are hot melt to the tubular members.

17. The ejection mechanism of claim 11, wherein the eject key further has a pair of restricting members extending from the control portion in a direction toward the front cover, and wherein the restricting members are movably disposed on opposite inner edges of the switch opening.

18. The ejection mechanism of claim 11, wherein a plurality of hooks is disposed on the inner surface of the front cover for engaging the control surface of the tray.

19. The ejection mechanism of claim 11, wherein a slot is formed on the front cover, and wherein the eject key is movably disposed in the slot.

20. The ejection mechanism of claim 11, wherein an anti-slip structure is disposed on the outer surface of the eject key.

* * * * *